United States Patent
Nguyen et al.

(10) Patent No.: US 10,440,365 B2
(45) Date of Patent: Oct. 8, 2019

(54) METHODS AND DEVICES FOR EMULATING LOW-FIDELITY CODING IN A HIGH-FIDELITY CODER

(71) Applicant: VELOS MEDIA, LLC, Plano, TX (US)

(72) Inventors: Nguyen Nguyen, Waterloo (CA); Dake He, Waterloo (CA); David Flynn, Kitchener (CA)

(73) Assignee: VELOS MEDIA, LLC, Plano, TX (US)

( * ) Notice: Subject to any disclaimer, the term of this patent is extended or adjusted under 35 U.S.C. 154(b) by 828 days.

(21) Appl. No.: 13/930,089

(22) Filed: Jun. 28, 2013

(65) Prior Publication Data
US 2015/0003518 A1    Jan. 1, 2015

(51) Int. Cl.
| | |
|---|---|
| *H04N 19/126* | (2014.01) |
| *H04N 19/134* | (2014.01) |
| *H04N 19/176* | (2014.01) |
| *H04N 19/46* | (2014.01) |
| *H04N 19/186* | (2014.01) |

(52) U.S. Cl.
CPC ......... *H04N 19/134* (2014.11); *H04N 19/126* (2014.11); *H04N 19/176* (2014.11); *H04N 19/186* (2014.11); *H04N 19/46* (2014.11)

(58) Field of Classification Search
CPC .. H04N 7/50; H04N 7/26244; H04N 7/26164; H04N 7/26335; H04N 7/26941
See application file for complete search history.

(56) References Cited

U.S. PATENT DOCUMENTS

| | | | | |
|---|---|---|---|---|
| 6,463,100 B1 * | 10/2002 | Cho | ...... | H04N 19/105 375/240.03 |
| 8,139,636 B2 * | 3/2012 | Sato | ...... | H04N 19/61 375/240.03 |
| 8,768,077 B2 * | 7/2014 | Sato | ...... | H04N 19/115 382/232 |

(Continued)

FOREIGN PATENT DOCUMENTS

| | | |
|---|---|---|
| WO | 2013003284 | 1/2013 |
| WO | 2013003284 A1 | 1/2013 |

OTHER PUBLICATIONS

EPO, Partial European Search Report relating to European Application No. 13174435.1, dated Nov. 27, 2013.

(Continued)

*Primary Examiner* — Shawn S An
(74) *Attorney, Agent, or Firm* — Spencer C. Patterson; Grable Martin Fulton PLLC

(57) ABSTRACT

Methods of encoding and decoding video in a low-fidelity mode are described. A coding unit level low-fidelity flag is present in the bitstream to signal whether low-fidelity mode is enabled for a particular coding unit or not. If enabled, then, for that coding unit, the chroma quantization parameter is determined using the luma quantization parameter adjusted by a low-fidelity-mode offset. If not enabled, then, for that coding unit, the chroma quantization parameter is determined using the luma quantization parameter without adjustment by the low-fidelity-mode offset. The chroma quantization parameter is then used in the scaling of quantized chroma transform domain coefficients. Use with luma or other video components is also proposed.

24 Claims, 6 Drawing Sheets

(56) References Cited

U.S. PATENT DOCUMENTS

| | | | |
|---|---|---|---|
| 2003/0147463 A1* | 8/2003 | Sato | H04N 7/50 375/240.05 |
| 2006/0018559 A1* | 1/2006 | Kim | H04N 19/122 382/251 |
| 2006/0171458 A1* | 8/2006 | Feng | H04N 19/176 375/240.03 |
| 2008/0317377 A1* | 12/2008 | Saigo | H04N 9/045 382/274 |
| 2009/0010338 A1* | 1/2009 | Wang | H04N 19/563 375/240.16 |
| 2009/0086816 A1* | 4/2009 | Leontaris | H04N 19/80 375/240.03 |
| 2009/0290641 A1 | 11/2009 | Crinon et al. | |
| 2009/0296808 A1 | 12/2009 | Regunathan | |
| 2012/0269266 A1* | 10/2012 | Lin | H04N 19/147 375/240.03 |
| 2013/0114685 A1* | 5/2013 | Kerofsky | H04N 19/126 375/240.03 |
| 2013/0223518 A1* | 8/2013 | Shibahara | H04N 19/70 375/240.03 |
| 2014/0226717 A1* | 8/2014 | Lim | H04N 19/426 375/240.12 |
| 2014/0254677 A1* | 9/2014 | Oh | H04N 19/0009 375/240.12 |

OTHER PUBLICATIONS

Sullivan et al.: "Chroma QP Range Extension" dated Jul. 3, 2012, XP030112704.

Tao et al.: "Mixed Chroma Sampling-rate Coding: Combining the Merits of 4:4:4 and 4:2:0 and Increasing the Value of Past 4:2:0 Investment" dated Jan. 19, 2012, XP030111092.

Dong, et al., "Adaptive Downsampling For High-Definition Video Coding", InterDigital Communications, San Diego, CA.

Flynn, et al. "High Efficiency Video Coding (HEVC) Range Extensions text specification": Draft 3, Document: JCTVC-M1005_v1, Apr. 18-26, 2013.

Bross, et al., Joint Collaborative Team on Video Coding (JCT-VC), JCTVC-K1003, v.13, High Efficiency Video Coding (HEVC) Text Specification Draft 9.

U.S. Appl. No. 13/735,782, filed Jan. 7, 2013.

WIPO, International Search Report and Written Opinion, relating to Application No. PCT/CA2014/050531, dated Sep. 8, 2014.

European Office Action dated Aug. 11, 2017.

JPO, Japanese Office Action relating to Japanese application No. 2016-522152, dated Sep. 12, 2018.

Sullivan et al.: "Chroma QP range extension", JCT-VC of ITU-T SG16 WP3 and ISO/IEC JTC 1/SC-29/WG 11, 10th meeting, SE, Jul. 11-20, 2012, Document JCTV-J0342.

Flynn et al.: "RExt: minimum chroma TU size restriction for low-fidelity coding mode" JCT-VC of ITU-T SG16 WP3 and ISO/IEC JTC1/SC29/WG11, 15th meeting: Geneva, CH, Oct. 23-Nov. 1, 2013, Document JCTVC-O0045.

Flynn et al.: "RExt: CU-adoptive chroma QP offsets" JCT-VC of ITU-T SG16 WP3 and ISO/IEC JTC1/SC29/WG11, 15th meeting: Geneva, CH, Oct. 23-Nov. 1, 2013, Document JCTVC-O0044.

SIPO, Chinese Office Action relating to Chinese application No. 201480036997.4, dated Oct. 9, 2018.

Bross et al. "High Efficiency Video Coding (HEVC) Text Specification": Draft 10 (For FDIS & Last Call), Document: JCTVC-L1003_v34, Jan. 14-23, 2013.

* cited by examiner

METHODS AND DEVICES FOR EMULATING LOW-FIDELITY CODING IN A HIGH-FIDELITY CODER

FIELD

The present disclosure generally relates to data compression and, in particular, to methods and devices for video coding that emulate low-fidelity coding in a high-fidelity coder.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.265/HEVC video coding standard. It defines a number of different profiles for different applications, including the Main profile, Main Still Picture profile and others.

There are a number of standards for encoding/decoding images and videos, including H.265, that use block-based coding processes. In these processes, the image or frame is divided into blocks, with sizes typically ranging from 4×4 to 64×64, although non-square blocks may be used in some cases, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

When spectrally transforming residual data, many of these standards prescribe the use of a discrete cosine transform (DCT) or some variant thereon. The resulting DCT coefficients are then quantized using a quantizer to produce quantized transform domain coefficients. The blocks of quantized coefficients are then entropy encoded and packaged with side information, like motion vectors and other data, to produce a bitstream of encoded video.

At the decoder, the bitstream is entropy decoded to reconstruct the quantized coefficients. The decoder then inverse quantizes and inverse transforms the reconstructed quantized coefficients to reconstruct the pixel domain residual. Using the same prediction operation as was used at the encoder, the pixel data is then reconstructed.

Pixel data is generally separated into luma and chroma components and each is encoded using a similar process (usually two chroma components). Because of human perception limitations regarding spatial location of colour data, chroma is typically subsampled such that for each chroma component, a single chroma sample is only sent for every two or four luma samples. This has worked well for natural scene video, but has posed problems for computer-generated content, such as text and graphics, which require sharp colour edge definition to avoid blurriness and other artefacts.

The unsuitability of chroma subsampling to some types of content becomes more problematic in the case of mixed content containing both natural scenes and computer-generated graphics.

BRIEF DESCRIPTION OF THE DRAWINGS

Reference will now be made, by way of example, to the accompanying drawings which show example embodiments of the present disclosure, and in which.

Similar reference numerals may have been used in different figures to denote similar components.

DESCRIPTION OF EXAMPLE EMBODIMENTS

Figure 1:
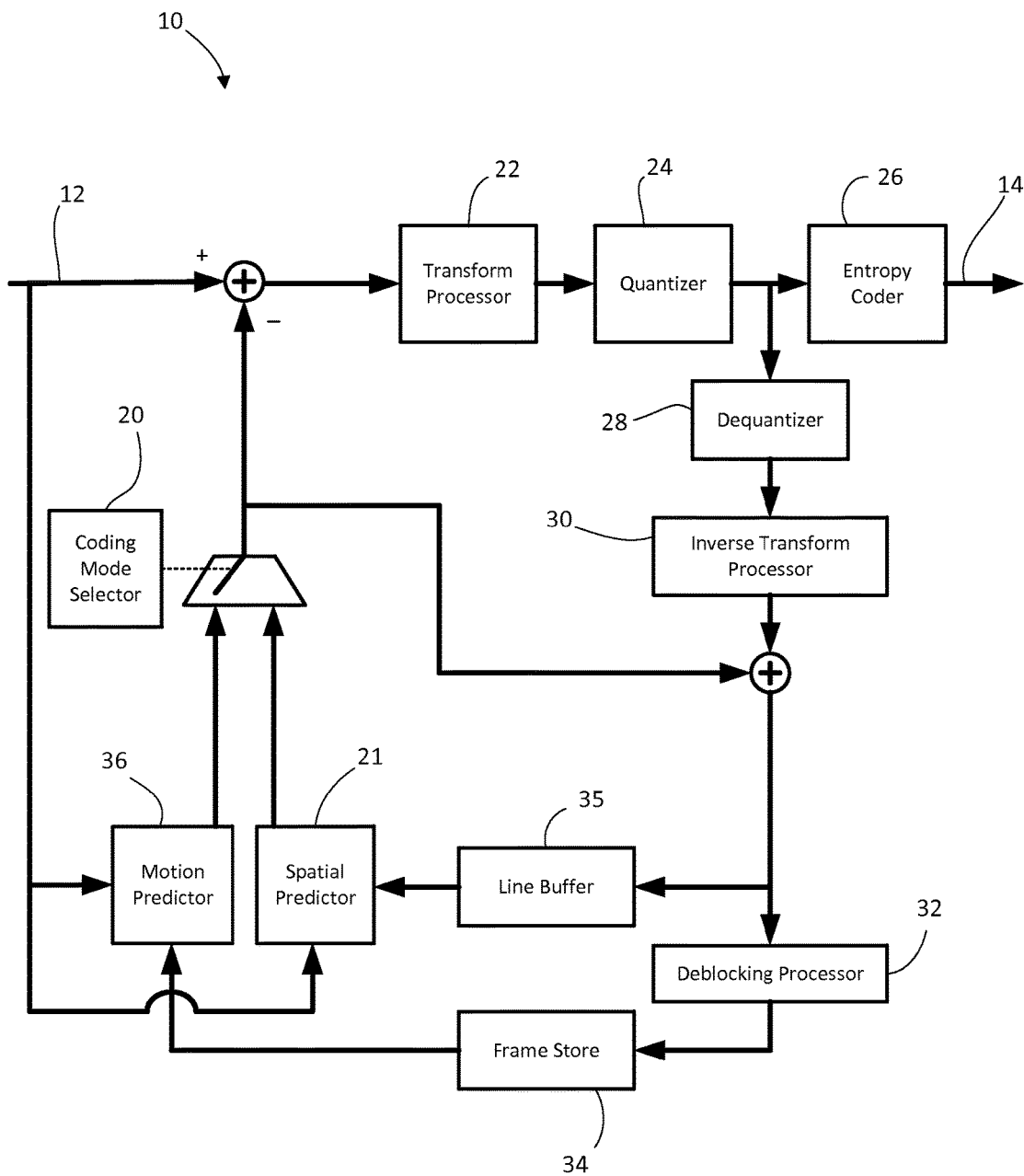
FIG. 1 shows, in block diagram form, an encoder for encoding video.

The present disclosure describes methods and encoders/decoders for encoding and decoding video to selectively emulate low-fidelity coding in a high-fidelity coder. The low-fidelity coding is signaled by a low-fidelity flag associated with a video component and associated with a coding unit. If the low-fidelity flag is set, then the video component for that coding unit is encoded or decoded in low-fidelity mode by adjusting the quantization parameter used in the encoding and/or decoding.

In a first aspect, the present disclosure describes a method of decoding video from a bitstream of encoded video using a video decoder, the video including a picture partitioned into coding units. The method includes, for one of the coding units, reconstructing a low-fidelity flag associated with that coding unit and associated with a video component. The method further includes, if the low-fidelity flag is set, then determining a quantization parameter for the video component based upon a low-fidelity-mode offset; if the low-fidelity flag is not set, then determining the quantization parameter for the video component without using the low-fidelity-mode offset; and dequantizing decoded coefficients in the video component for the coding unit, based upon the quantization parameter, to produce dequantized coefficients.

The present disclosure further discloses a method of encoding video to produce a bitstream of encoded video using a video encoder, the video including a picture partitioned into coding units. The method includes, for one of the coding units, encoding a low-fidelity flag associated with that coding unit and associated with a video component, wherein the low-fidelity flag is set if the coding unit is to be encoded in low-fidelity mode and is not set if the coding unit is not to be encoded low-fidelity mode. The method then further includes, if the coding unit is to be encoded in the low-fidelity mode, determining a quantization parameter for the video component based upon a low-fidelity-mode offset; if the coding unit is not to be encoded in the low-fidelity mode, then determining the quantization parameter for the video component without using the low-fidelity-mode offset; and quantizing transform coefficients in the video component for the coding unit, based upon the quantization parameter, to produce quantized coefficients.

The video component may include at least one of a luma component, a chroma component, an alpha component, a red component, a green component, and a blue component.

In a further aspect, the present disclosure describes encoders and decoders configured to implement such methods of encoding and decoding.

In yet a further aspect, the present disclosure describes non-transitory computer-readable media storing computer-executable program instructions which, when executed, configured a processor to perform the described methods of encoding and/or decoding.

Other aspects and features of the present disclosure will be understood by those of ordinary skill in the art from a review of the following description of examples in conjunction with the accompanying figures.

In the description that follows, some example embodiments are described with reference to the H.264 standard for video coding and/or the developing H.265/HEVC standard. Those ordinarily skilled in the art will understand that the present disclosure is not limited to H.264/AVC or H.265/HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. The term "frame" may be replaced with "picture" in H.265/HEVC. A series of frames/pictures may be called a "sequence" in some cases. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, etc., as will become apparent in light of the description below.

In some cases, the examples below are specific to encoding and decoding of chroma components, i.e. the two colour difference components Cb and Cr. The present disclosure is not limited to one or more chroma components, but may be applied to one or more other video components. Example video components, depending on the format of the video data, may include the luma component, one or both chroma components Cb and Cr, other colour difference components, the alpha component, the red component, the green component, and/or the blue component.

Figure 2:
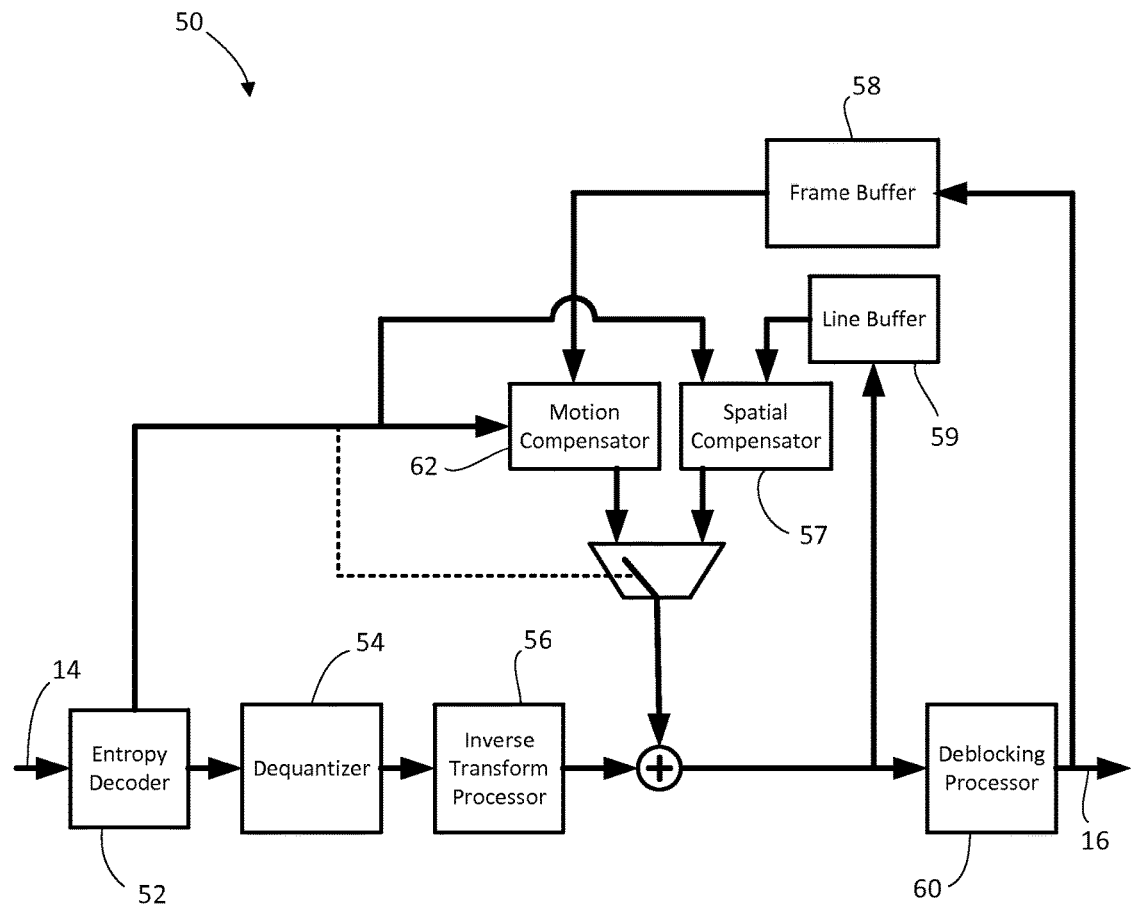
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like H.265/HEVC.

The encoder 10 includes a spatial predictor 21, a coding mode selector 20, a motion predictor 36, a transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded, i.e. whether the prediction comes from the motion predictor 36 (inter coded) or the spatial predictor 21 (intra coded). The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform, a wavelet transform, or others may be used in some instances. The block-based transform is performed on a transform unit. The transform unit may be the size of the coding unit, or the coding unit may be divided into multiple transform units. In the H.264 standard, for example, a typical 16×16 macroblock (coding unit) contains sixteen 4×4 transform units and the DCT process is performed on the 4×4 blocks. Transform unit (TU) may be other sizes. In some cases, the TU may be non-square, e.g. a non-square quadrature transform (NSQT).

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction operation, the encoder 10 creates a predicted block or unit based on the data of nearby pixels. There are various modes or directions for prediction. In some cases rate-distortion optimization may be used to select a mode/direction. The nearby pixels used in the prediction operation are reconstructed pixels that have been previously encoded and decoded and stored in a line buffer 35 within the feedback loop. The difference between the actual pixel data for the block and the predicted block is a residual block, i.e. an error signal. The residual data is transformed, quantized and encoded for transmission in the bitstream 14.

Inter-coded frames/blocks rely upon temporal prediction, i.e. they are predicted using reconstructed data from other frames/pictures. The encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. The motion predictor 36 uses the frames/slices stored in the frame store 34 as source frames/slices for comparison to a current frame for the purpose of identifying similar blocks. In other words, a motion vector search is carried out to identify a block within another frame/picture. That block is the source of the predicted block or unit. The difference between the predicted block and the original block becomes the residual data that is then transformed, quantized and encoded.

Those ordinarily skilled in the art will appreciate the details and possible variations for implementing video encoders.

The decoder 50 includes an entropy decoder 52, dequantizer 54, inverse transform processor 56, and deblocking processor 60. The deblocking processor 60 may include deblocking and filtering processors. A line buffer 59 stores reconstructed pixel data while a frame/picture is being decoded for use by a spatial compensator 57 in intra-coding. A frame buffer 58 stores fully-reconstructed and deblocked frames for use by a motion compensator 62 in applying motion compensation.

The bitstream 14 is received and decoded by the entropy decoder 52 to recover the quantized coefficients. Side information may also be recovered during the entropy decoding process, including coding mode information, some of which may be supplied to the feedback loop for use in creating the predictions. For example, the entropy decoder 52 may recover motion vectors and/or reference frame information for inter-coded blocks, or intra-coding mode direction information for the intra-coded blocks.

The quantized coefficients are then dequantized by the dequantizer 54 to produce the transform domain coefficients, which are then subjected to an inverse transform by the inverse transform processor 56 to recreate/reconstruct the residual pixel-domain data. The spatial compensator 57 generates the video data from the residual data and a predicted block that it creates using spatial prediction. The spatial prediction applies the same prediction mode/direction as was used by the encoder in reliance upon previously-reconstructed pixel data from the same frame. Inter-coded blocks are reconstructed by creating the predicted block based on a previously-decoded frame/picture and the motion vector decoded from the bitstream. The reconstructed residual data is then added to the predicted block to generate the reconstructed pixel data. Both spatial and motion compensation may be referred to herein as "prediction operations".

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

In H.265/HEVC and some other coding standards, the picture is divided in a non-overlapping set of blocks. In H.265/HEVC, for example, each picture is divided into 64×64 coding tree blocks (CTB) (sometimes referred to as "coding tree units"). Each CTB may then be further divided in a quad-tree structured division into coding-tree nodes and, eventually, coding units. Note that in this structure the "leaf nodes", i.e. the coding units (CUs), are not necessarily all the same size. As an example, a CTB may be divided into 32×32 blocks, two of which may be CUs (leaf nodes) and two of which may be further divided into 16×16 blocks. Some of these may be CUs and some may be yet further divided into 8×8 blocks, etc.

Although the foregoing description refers to pixels, it will be appreciated that many video coding systems use both luma data (Y) and chrominance data (U and V, or Cb and Cr) for each pixel. In fact, the separation of pixel data into luma and chroma in digital video systems allows for the use of chroma subsampling. Because the human eye is less sensitive to chroma detail in a natural video scene, the chroma data may be subsampled and sent with lower resolution so as to achieve greater compression. In current video coding standards, a chroma sampling format of 4:4:4 indicates no chroma subsampling, 4:2:2 indicates chroma subsampling by a factor of 2 horizontally, and 4:2:0 indicates chroma subsampling by a factor of 2 horizontally and vertically.

Digital video compression using 4:2:0 chroma subsampling is in common usage because of the limited human ability to perceive spatial locality of colour in natural scenes. However, digital video is more commonly being used to encode/decode computer-generated content, or mixtures of computer-generated content and natural scenes. The computer-generated content is typified by sharp edges, impulses and high-frequency. An example is text or computer graphics. High fidelity is required to avoid blurring of the sharp edges in such content, both for luma and chroma components. Note that "computer-generated" content in this respect does not necessarily refer to "computer-generated imagery" or "CGI", where the computer-created content is intentionally designed to blend into, or appear as, a natural scene in a movie or television program.

One problem with current coding, in the case of low chroma fidelity video, is that it seems that a 4:4:4 system is unable to achieve the same rate-distortion performance as a 4:2:0 system, or even a 4:2:2 system, when coding the same video source. Because portions of the video require higher fidelity, then the entire video is coded in 4:4:4 format. The portions that are originally in a 4:2:0 format, such as natural scene images or videos, are upsampled to 4:4:4 and encoded in accordance with that format. When a 4:2:0 format video is upsampled and encoded in 4:4:4 format, it does result in slightly better chroma fidelity, but the bit rate increases by about 10%. The cost in terms of bit rate is often unjustified in view of the small perceptual improvement (if any).

The extra cost in bit rate is partly due to the extra chroma coefficients, but also partly because of extra overhead. For example, in H.265/HEVC 4:2:0 coding, an 8×8 transform unit would result in a 4×4 chroma transform block, which would not inherit any partitioning of the co-located 8×8 luma transform block. When the chroma is upsampled and coded in 4:4:4 format, an 8×8 chroma transform block results and it takes on the partitioning (and extra header overhead and extra intra-mode signalling) of the co-located luma transform block. In addition, when larger chroma transform blocks are used the coefficients in those blocks are quantized with a smaller quantization step size, resulting in more coefficient data for coding. The same quantization parameter results in a smaller quantization step size for larger transform blocks due to the structure of the HEVC quantization operation than is the case with smaller transform blocks. In other words, with larger transform blocks the encoder is configured to retain more precision (larger/more coefficients) than is the case with smaller transform blocks. Therefore, the upsampling and coding in 4:4:4 format results in additional coefficient data.

U.S. patent application Ser. No. 13/735,782, filed Jan. 7, 2013, and owned in common herewith, describes the problem with video having mixed fidelity requirements. In that application, it was proposed that the prediction block be filtered to remove (generally) higher frequency components before the prediction block is used to generate residual data. A flag for each block controlled whether the prediction was filtered for that block.

In one aspect, the present disclosure proposes to modify the quantization and/or other coding parameters used in low-fidelity areas of the picture. In one sense, within the 4:4:4 format coding process, blocks or groups of blocks that correspond to a low-fidelity area may have their quantization parameters adjusted so as to treat those areas in a manner that emulates what may have resulted from coding in 4:2:0 format. For example, with respect to chroma components, the quantization parameters may be adjusted to compensate for the fact that larger transform blocks are used in 4:4:4 than would otherwise have been used in 4:2:0 where subsampling takes place. To treat those blocks like they would have been treated in 4:2:0 the encoder may, for example, quantize the blocks more aggressively or, for example, restrict partitioning of the 8×8 block.

Many of the examples described below are proposed for use in coding chroma components in particular; however, the processes and techniques described may be applied to luma components, or luma and chroma components, in some embodiments. As mentioned above, the present disclosure is generally applicable to encoding and decoding of video components, where video components (depending on the format of the video data) may include one or more of the luma component, Cb, Cr, other colour difference components, the alpha component, and/or the RGB components.

Quantization, in general, maps a signal with a range of values to a quantized signal with a reduced range of values. This range reduction is inherently lossy, but allows the quantized signal to be represented with fewer bits. An example of quantization is the hard-decision scalar quantizer in H.265/HEVC, which takes a transform coefficient c and produces a quantized transform coefficient u according to:

$$u = \text{sign}(c)\left\lfloor \frac{|c|}{q} + \theta \right\rfloor$$

In the expression above, q is quantization step size, which is a function of a given quantization parameter, QP, and θ is a rounding offset. The sign function returns −1 if c is less than zero and +1 otherwise. The relationship between q and QP is, in one example, given by:

$$q(QP) = 5 \cdot 2^{\left[\frac{QP\%6}{6} + \left\lfloor \frac{QP}{6} \right\rfloor - 3\right]}$$

When reconstructing a transform domain coefficient at a decoder, the reconstructed coefficient ĉ may be determined as:

$$\hat{c} = \frac{u \times \text{scaleFactor}(QP\%6) \times 2^{\left\lfloor \frac{QP}{6} \right\rfloor} + \theta}{2^{(\text{bitDepth}-8)} \times \frac{\text{TransformSize}}{2}}$$

In this expression, scaleFactor is a function for selecting a quantization scaling value based upon QP. The bitDepth is typically 8 in many implementations, meaning that this term of the denominator resolves to unity and the denominator is effectively governed by the TransformSize. It will be noted that if the TransformSize increases, then the quantized transform coefficient u must increase proportionally to compensate. In other words, the quantization step size is smaller for larger transform sizes.

When it comes to quantization of chroma components, the QP of the luma components is converted to a chroma QP using a preselected offset value (if any) to adjust the luma QP. This adjusted luma QP value is clipped and then a look-up table is used to convert the adjusted luma QP value to a chroma QP value. In the case of 4:4:4 format coding, the mapping in the look-up table between adjusted luma QP and chroma QP is 1-to-1. In the case of 4:2:0 format coding, the mapping in the 4:2:0 look-up table is 1-to-1 for many lower QP values but diverges for larger QP values.

In accordance with one aspect of the present disclosure, the chroma QP is obtained based upon a luma QP value that is selectively further adjusted for a coding unit by a low-fidelity-mode QP offset. The use of the low-fidelity-mode QP offset is based upon whether low-fidelity mode is signaled for that coding unit. The signalling may be based upon a flag encoded for that coding unit, in some embodiments. In some cases, the flag may be inferred on the basis of inheritance of a flag set higher in the structural hierarchy of the CTB.

The value of the low-fidelity-mode QP offset may be signaled in the bitstream, for example in a picture parameter set (PPS) or sequence parameter set (SPS), or it may be a pre-set value. The pre-set value may be based upon a comparison of distortion associated with 4:2:0 format versus 4:4:4 format coding, as will be outlined below.

In a transform block, the error caused by quantization per transform coefficient may be approximated as:

$$e = \theta q$$

In this expression, q is the quantization step size, and θ is the rounding offset from the quantization expression. In other words, the error is directly correlated to the quantization step size, as would be expected. The distortion is proportional to error squared. For example, the distortion may be expressed as:

$$D = \int_{-\frac{q}{2}}^{\frac{q}{2}} \frac{1}{q} x^2 \, dx$$

$$= \frac{q^2}{12}$$

Put another way, the distortion per coefficient is, on average, proportional to the quantization step size squared, which may be expressed as:

$$D = \frac{q^2}{k}$$

In this expression, k is some constant. Assuming an 8×8 residual chroma block, as an example, then the distortion in native 4:2:0, over the 64 coefficients in the block, is given by:

$$D_{4:2:0} = \frac{q_{4:2:0}^2}{k} \cdot 64$$

However, assume an 8×8 residual chroma block in 4:4:4 that resulted from upsampling using a conventional spatial interpolation filter. In that case, it may be expected that most of the information will be contained in the upper-left 4×4 sub-block of transform block. In such a case, the total distortion for the 8×8 block may be approximated as:

$$D_{4:4:4} = \frac{q_{4:4:4}^2}{k} \cdot 16$$

Note that coding four 4×4 blocks should be roughly equivalent to coding one 8×8 block in a rate-distortion sense. However, conceptually at least, when a 4×4 chroma block in native 4:2:0 is upsampled to a 8×8 chroma block in 4:4:4, the rate-distortion cost of coding that 8×8 block is roughly equivalent to one 4×4 block, not four 4×4 blocks. In order to compensate for this and re-balance the rate-distortion cost associated with different block sizes, the proposed solution adjusts the quantization of the 8×8 block. In other words, the present disclosure, in one aspect, proposes to increase quantization of (upsampled) 4:4:4 to better emulate the distortion of 4:2:0 coding. Accordingly, to evaluate the change in distortion required:

$$D_{4:2:0} = D_{4:4:4}$$

$$\frac{q_{4:2:0}^2}{k} \cdot 64 = \frac{q_{4:4:4}^2}{k} \cdot 16$$

$$q_{4:4:4} = \sqrt{\alpha} \, q_{4:2:0}$$

Here, the symbol $\alpha=64/16=4$. Using the relationship between q and QP, the above converts to:

$$QP_{4:4:4} = QP_{4:2:0} + 6$$

Note that the above analysis is based on the spatial interpolation filter being ideal insofar as it assumes that all of the information upsampled to 8×8 will be contained in the 4×4 block in the upper-left corner of the block. In practice, the upsampling process results in aliasing around the cut-off frequency and, depending on the filter, may result in the information being largely contained within the 5×5 block in the upper-left corner of the 8×8 transform block. In that case, $\alpha=64/25=3.2$, which leads to a low-fidelity-mode QP offset of approximately 5, meaning:

$$QP_{4:4:4} = QP_{4:2:0} + 5$$

The same analysis may be performed for 4:2:2 to 4:4:4 conversions. In such a case, using the above analysis $\alpha=2$, and the QP adjustment is +3. Taking into account aliasing, the low-fidelity-mode QP offset may be closer to +2.

It will be understood that low-fidelity-mode QP offsets may be determined/selected for specific block sizes, such as 8×8, 16×16, 32×32, etc.

It will be appreciated that the extent to which aliasing effects should be taken into account will depend on the upsampling filter used.

A hierarchy of binary flags may signal to the decoder whether the low-fidelity-mode offsets are enabled or disabled at various granularities. At the SPS or PPS level, flags may be provided that enable or disable the use of the feature for the entire coded video sequence, or for a number of pictures that reference a particular PPS. The PPS may also provide high-level options such as the QP offsets to be used when the mode is selected, unless there is a pre-set QP offset.

If the encoder determines that low-fidelity mode should be used for all CUs in the picture, the PPS may contain a flag that instructs the decoder to behave as if the per-CU flag were asserted for every CU in the picture, without having to incur the bitstream cost of signaling the per-CU flag.

For each CU in the picture, presuming the feature is permitted/enabled, a single context-adaptive arithmetically-encoded flag may be provided that controls the use of the low-fidelity mode for that CU. In one embodiment, no prediction of the flag occurs, although in other embodiments it may be possible to predict from spatially-neighbouring flags or to use some content-based predictor. The flag is not signaled in cases where the block is skipped. The flag is positioned in the syntax in such a way that it is only signaled when appropriate, i.e., if the residual is zero/skipped, no flag is sent (except that, in the case of intra N×N partitioning, the flag may be required, if the embodiment includes restricting the number of intra-prediction partitions for one or more video components when the flag is set). In another embodiment, rather than avoiding sending the flag when no residual is sent, the flag is not sent if no chroma residual is sent.

As noted above, the low-fidelity-mode QP offset may be pre-set in the encoder and decoder. In another embodiment, it may be signaled explicitly in the PPS or SPS. In yet another embodiment, two offsets may be signaled: one for each chroma component. In yet further embodiments, an offset (or pair of offsets) may be signaled for each transform size. The offsets may be signaled as a differential from a preset low-fidelity-mode QP offset value in some instances.

Figure 3:
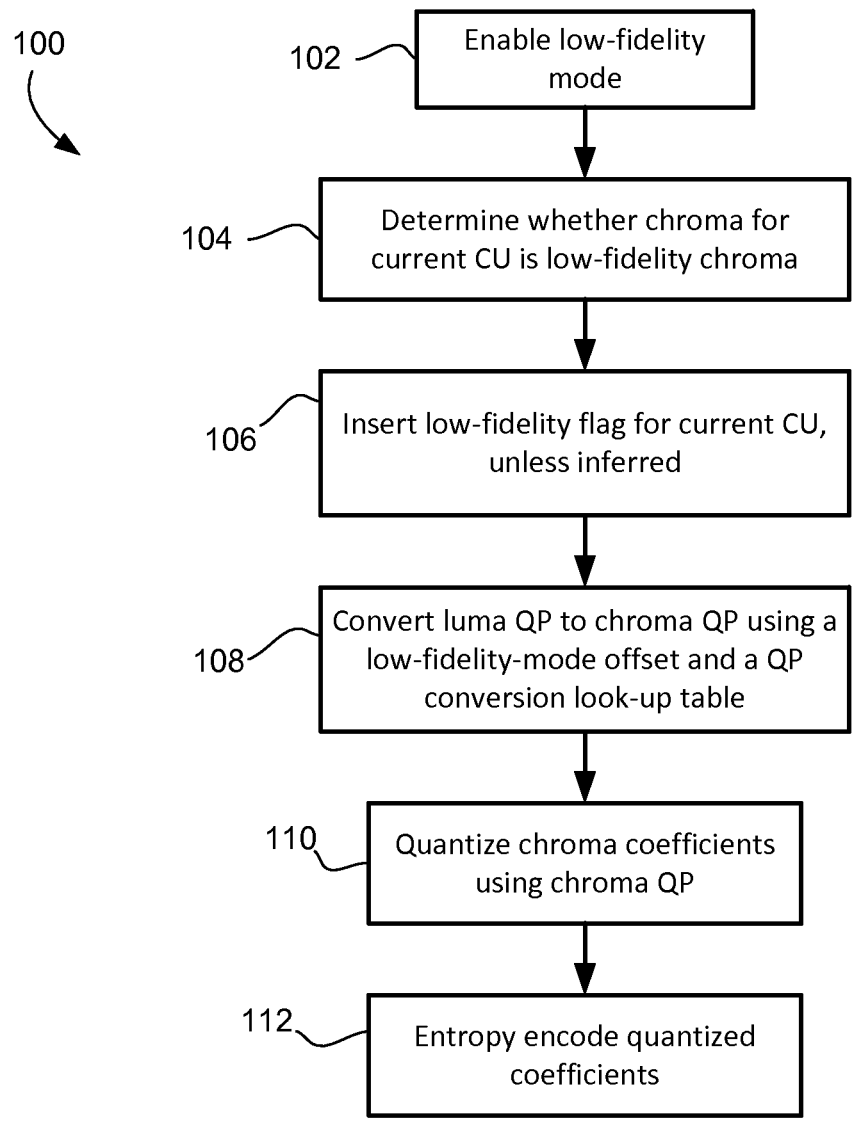
FIG. 3 shows, in flowchart form, an example process for encoding video.

One example method 100 for encoding video using a low-fidelity mode option is illustrated in FIG. 3 in flowchart form. This example is specific to coding of chroma components in low-fidelity mode. As mentioned above, luma components may alternatively or additionally be coded in low-fidelity mode as well.

The encoder initially enables low-fidelity mode capability in operation 102. This may occur by default, or may be signaled in the bitstream by including a low-fidelity enablement flag. The flag may be put in the SPS, PPS, or elsewhere in the bitstream to indicate that the low-fidelity mode is enabled and that the decoder should expect and decode low-fidelity flags.

In operation 104, for a current coding unit (CU), the encoder determines whether to code the chroma in low-fidelity mode. This determination may be based on a number of possible factors. By way of non-limiting illustration, in one example the determination is based upon the concentration of non-zero coefficients into the upper-left quadrant of a transform block. In this example, the number of non-zero coefficients in the low frequency region of the transform block (e.g. the upper-left quadrant) is denoted X, and the number of non-zero coefficients in the remainder of the block is denoted Y. If Y/(X+Y) is less than some predefined threshold (e.g. 50-60%), then the transform block is considered low-fidelity. Once all transform blocks in a coding unit are determined to be low-fidelity or not, a collective decision can then be made for the coding unit. In another example, X denotes the size of the smallest rectangular region in a transform unit containing the DC position, and Y denotes the size of the remainder of the block. In yet another example, the sum of coefficient levels may be used instead of the number of non-zero coefficients. Different thresholds may be set for different coding unit sizes. Note that the coefficients in this example are based upon transform of the original pixel data and not from transform of residual data.

In a further non-limiting example, the low-fidelity determination may be based on relative distortion measurements and a set of conditions. In this example, the coding unit is coded in both low and high-fidelity modes and the total chroma distortion is determined. The high-fidelity distortion is denoted $D_0$ and the low-fidelity distortion is denoted $D_1$. Using a distortion model, such as that outlined above, and the applicable quantization step size, the expected number of transform coefficients for low-fidelity mode $N_1$ and for high-fidelity mode $N_0$ is calculated. These estimates are then compared to the actual number of transform coefficients that resulted from the coding, which may be denoted N. For low-fidelity mode (index i=1) and high-fidelity mode (index i=0), the following condition may be evaluated:

$$|N - N_i| > \left|N_i - \frac{N}{4}\right|$$

If the condition is true for both cases, then the coding unit may be designated as low-fidelity. Otherwise, it is categorized as high-fidelity. In another embodiment, different decision rules may be used to determined categorization of the coding unit, such as the following example decision chart:

| Condition i = 0 | Condition i = 1 | Decision |
|---|---|---|
| False | False | High fidelity |
| False | True | Low fidelity |
| True | False | High fidelity |
| True | True | Low fidelity |

The encoder inserts a low-fidelity flag 106 into the header for the current CU unless the flag value can be inferred. In some cases, depending on the signaling convention used, a low-fidelity flag may be inferred based upon neighbouring low-fidelity flags (e.g. the flags for the CU to the right, below and/or diagonally to the bottom-right), or upon one or more flags higher in the coding structure, e.g. within the CTB syntax. If the flag may be inferred, then it is not sent in the bitstream; otherwise, it is inserted in the header for the current CU. In one example, the low-fidelity flag is set to 1 if the low-fidelity mode is to be used for the current CU and is set to zero if the low-fidelity mode is not to be used for the current CU.

Assuming that the low-fidelity flag is to be used for the current CU (i.e. that the low-fidelity flag value is set to 1), then in operation 108 the encoder derives the chroma QP value from the luma QP value using a low-fidelity-mode offset. As described above, in some embodiments the low-fidelity-mode offset may be a pre-set value and may be selected in part based upon the transform size. A look-up table, formula, or other such mechanism may be used to convert the luma QP to a chroma QP. The chroma QP is derived from the luma QP by adding the low-fidelity-mode offset and then performing conversion. Note that the adjustment of the luma QP before conversion is based upon the fact that the low-fidelity mode is applied to the current CU, as indicated by the low-fidelity flag associated with the current CU. The adjustment is not a global offset applied to all conversions of luma QP to chroma QP, but is selective and is based upon whether the low-fidelity mode is to be applied to this specific CU or not. The low-fidelity chroma QP conversion from luma QP may be expressed as:

$$QP_{chroma} = [\text{clip}(QP_{luma} + QP_{global\text{-}offset} + QP_{low\text{-}fid\text{-}mode\ offset})]_{look\text{-}up\ table}$$

In the above expression, $QP_{luma}$ is the luma QP, and $QP_{global\text{-}offset}$ is a fixed offset applied when adjusting QP before using the look-up table. In some instances, the fixed offset may be built in to the table itself, but in others it may be applied before use of the table. The $QP_{global\text{-}offset}$ is applied irrespective of whether the low-fidelity mode is applied to the current CU.

In operation 110, the encoder quantizes the chroma coefficients using the chroma QP obtained in operation 108 to obtain quantized coefficients. Those quantized coefficients are then entropy encoded in operation 112.

In operation 108, described above, a look-up table, formula or other such mechanism is used to convert the adjusted luma QP to chroma QP. In some implementations, the encoder and decoder may have QP conversion look-up tables that are specific to different coding format, like 4:4:4, 4:2:2, and 4:2:0. In some embodiments, since the coding of the video in these examples is generally 4:4:4 format then the 4:4:4 format look-up table may be used for obtaining chroma QP. However, in some embodiments, the encoder and decoder may use the 4:2:0 QP conversion look-up table for coding units for which the low-fidelity mode is enabled. That is, if the low-fidelity flag is set for a coding unit, then the chroma QP is obtained using the 4:2:0 look-up table instead of the 4:4:4 table that would otherwise be used.

Figure 4:
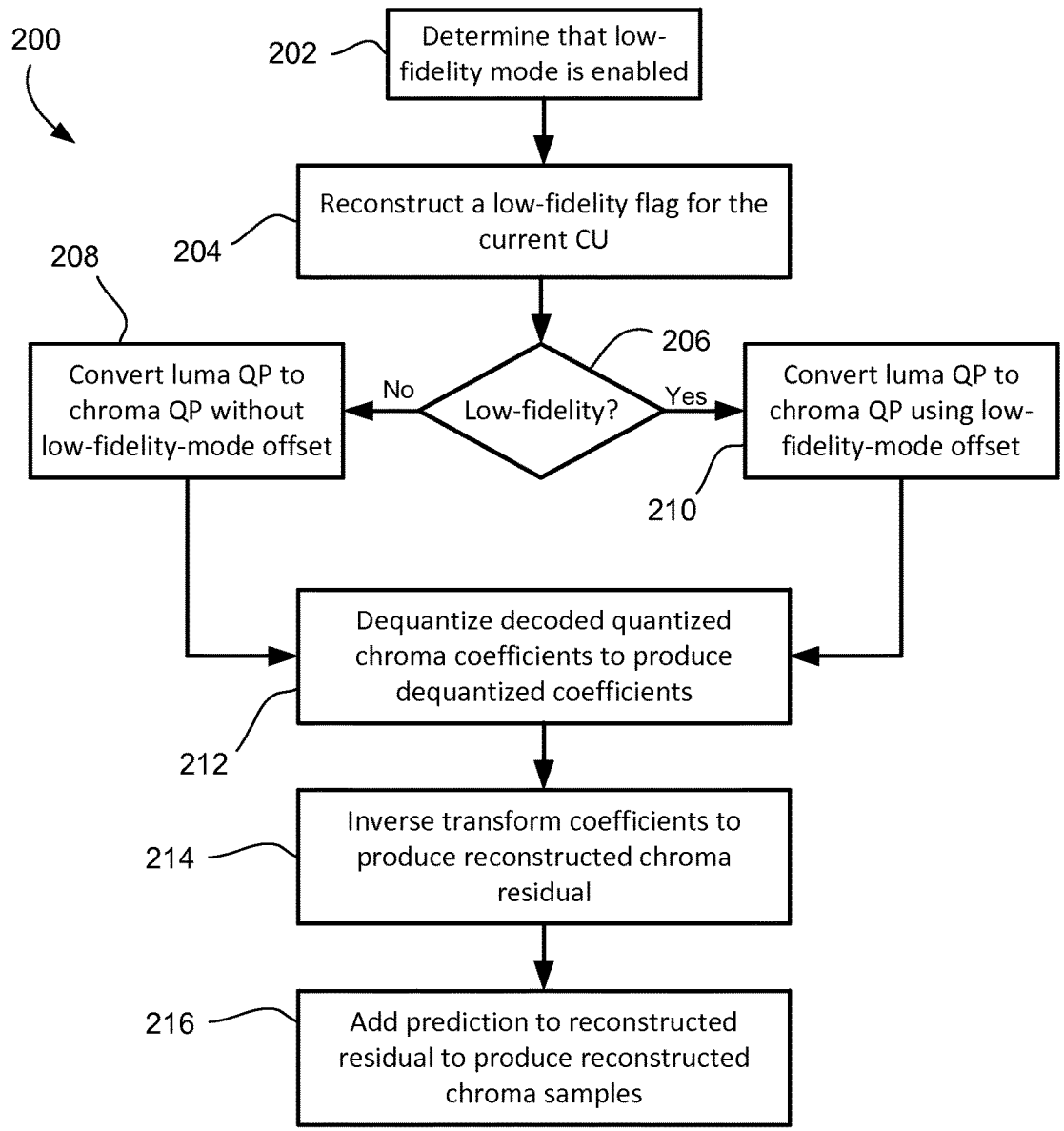
FIG. 4 shows, in flowchart form, a process for decoding a bitstream of encoded video that may be based upon filtered predictions.

Reference is now made to FIG. 4, which shows, in flowchart form, an example method 200 for decoding a bitstream of encoded video data with a chroma low-fidelity mode. The method 200 includes an operation 202 of determining that the chroma low-fidelity mode capability is enabled for the picture and/or sequence of video. This enablement may be determined in the sense that it is enabled by default, or it may be explicitly signaled in the bitstream using an enablement flag. The enablement flag may be decoded from the SPS, PPS, or from elsewhere in the bitstream, depending on the implementation.

In operation 204, the decoder reconstructs a low-fidelity flag for a current CU. The low-fidelity flag may be reconstructed by decoding it from the bitstream, such as from a header associated with the current CU, in some cases. In some instances, the low-fidelity flag may be reconstructed in the sense that it is inferred. In some embodiments, the flag value may be inferred from the values of flags in neighbouring CUs or based upon a flag set higher in the coding hierarchy, as mentioned earlier.

At operation 206, the decoder determines whether the reconstructed flag value is 1 or 0, i.e. whether the low-fidelity mode is to be applied or not. If not, then in operation

208 the chroma QP is determined by converting the luma QP to a chroma QP using the look-up table (or formula, or other mechanism), without adjusting the luma QP using the low-fidelity-mode offset. If the low-fidelity flag is set, then in operation 210, the chroma QP is determined by adjusting the luma QP using the low-fidelity-mode offset and converting the adjusted luma QP to a chroma QP. In either case, a global QP offset may be applied to the luma QP, if the coding scheme provides for such an offset.

The chroma QP is then used in operation 212 to dequantize the decoded quantized chroma coefficients to produce dequantized chroma coefficients. The dequantization operation may use the QP value in its scaling formula, as described above, or the QP value may first be converted to a quantization step size that is then used in a dequantization operation, depending on the implementation.

In operations 214 and 216, respectively, the dequantized chroma coefficients are inverse transformed to produce reconstructed chroma residuals, and the reconstructed chroma residuals are combined with predicted chroma samples to generate a block of reconstructed chroma samples.

In another aspect, on its own or together with QP adjustments, the assertion of the low-fidelity mode in a 4:4:4 coding process may include a resulting prohibition on 4×4 chroma transform block signaling so as to model 4:2:0 behaviour. That is, when the low-fidelity mode is asserted for a coding unit, then 4×4 intra transform blocks are not permitted for chroma. With 4:2:0 coding, an 8×8 luma block partitioned into 4×4 luma transform blocks would normally result in a corresponding 4×4 chroma block partitioned into 2×2 chroma transform blocks; however, 2×2 blocks are not defined in the H.265/HEVC specification, so H.265/HEVC prevents the chroma 4×4 transform tree from modelling the further split seen in the corresponding luma block and stops the partitioning at 4×4. When 4:2:0 content is upsampled and coded in 4:4:4, the chroma content that would otherwise be coded as a 4×4 transform block is coded as an 8×8 transform block. Moreover, the splitting that is blocked in 4:2:0 is allowed to occur in 4:4:4, meaning that the 8×8 chroma block is partitioned into 4×4 transform blocks, each of which is coded along with the overhead required. In addition, in the case of intra-coding, when an 8×8 chroma transform is partitioned into four 4×4 chroma transform blocks, each 4×4 chroma block may have its own intra-mode direction signaling, instead of one 8×8 intra-mode direction. When coding the corresponding block in 4:2:0 the prohibition on partitioning a 4×4 block would prevent there from being four intra modes (one for each 2×2 block). In order to eliminate this extra overhead from using 4:4:4 coding, in this aspect of the present disclosure an 8×8 low-fidelity chroma block is prevented from being further partitioned into four 4×4 blocks, thereby modelling the behaviour of a 4:2:0 coder.

In some embodiments, the above described low-fidelity mode operation may be implemented in conjunction with the prediction filtering described in U.S. patent application Ser. No. 13/735,782, filed Jan. 7, 2013. The same CU-level flag may be used to enable/disable both processes, or separate flags may be used.

In one non-limiting example, and without restricting the present disclosure to H.265/HEVC or variants thereof, the following pseudo-code syntax illustrates one implementation of an aspect of the present disclosure through changes to the current draft second edition H.265/HEVC syntax.

The syntax for the picture parameter set may be modified to include the following elements:

|  | Descriptor |
| --- | --- |
| pic_parameter_set_rbsp( ) { | |
| ... | |
|   if( pps_extension_flag ) { | |
|     lowfidelity_enabled_flag | u(1) |
|     if( lowfidelity_enabled_flag ) { | |
|       lowfidelity_forced_flag | u(1) |
|       lowfidelity_qp_cb_offset | ue(v) |
|       lowfidelity_qp_cr_offset | ue(v) |
|     } | |
|     ... | |
|   } | |

In the above syntax, lowfidelity_enabled_flag is 1 if a cu_lowfidelity_flag may be present in the bitstream. The lowfidelity_forced_flag is 1 when cu_lowfidelity_flag is not present in the bitstream and may be inferred to be 1. The lowfidelity_qp_cb_offset specifies an additional QP offset to be applied when scaling chroma Cb transform coefficients. The lowfidelity_qp_cr_offset specifies an additional QP offset to be applied when scaling chroma Cr transform coefficients.

|  | Descriptor |
| --- | --- |
| coding_unit( x0, y0, log2CbSize ) { | |
|   ... | |
|   if( CuPredMode[ x0 ][ y0 ] != MODE_INTRA \|\| log2CbSize = = MinCbLog2SizeY ) | |
|     part_mode | ae(v) |
|   CuLoFiFlagDone = 0 | |
|   if( CuPredMode[ x0 ][ y0 ] = = MODE_INTRA ) { | |
|     ... | |
|     if( LoFiFlagPresent && ChromaArrayType = = 3 && IntraSplitFlag ) { | |
|       cu_lowfidelity_flag[ x0 ][ y0 ] | ae(v) |
|       CuLoFiFlagDone = 1 | |
|     } | |
|     if( ChromaArrayType = = 3 && IntraSplitFlag && !cu_lowfidelity_flag[ x0 ][ y0 ] ) | |
|       for( j = 0; j < nCbS; j = j + pbOffset ) | |
|         for( i = 0; i < nCbS; i = i + pbOffset ) | |
|           intra_chroma_pred_mode[ x0 + i ][ y0 + j ] | ae(v) |
|     else if( ChromaArrayType > 0 ) | |
|       intra_chroma_pred_mode[ x0 ][ y0 ] | ae(v) |
|     } | |
|   } | |
|   ... | |

| | Descriptor |
|---|---|
| ```
        if( rqt_root_cbf ) {
            if( LoFiFlagPresent && !CuLoFiFlagDone )
                cu_lowfidelity_flag[ x0 ][ y0 ]
            MaxTrafoDepth = ( CuPredMode[ x0 ][ y0 ] = = MODE_INTRA ?
                            ( max_transform_hierarchy_depth_intra + IntraSplitFlag ) :
                            max_transform_hierarchy_depth_inter )
            transform_tree( x0, y0, x0, y0, log2CbSize, 0, 0 )
        ...
}
``` | ae(v) |

In the above example syntax for decoding a coding unit, the cu_lowfidelity_flag[x0][y0] is 1 if an additional chroma QP offset is to be applied during the scaling process for chroma transform coefficients.

| | Descriptor |
|---|---|
| ```
transform_unit( x0, y0, xBase, yBase, log2TrafoSize, trafoDepth, blkIdx ) {
    ...
    if( cbf_luma[ x0 ][ y0 ][ trafoDepth ] )
        residual_coding( x0, y0, log2TrafoSize, 0 )
    if( log2TrafoSize > 2 | | ChromaArrayType = = 3
&& !cu_lowfidelity_flag[ xBase ][ yBase ] ) {
        ...
        residual_coding( x0, y0 + ( tIdx << log2TrafoSizeC ), log2TrafoSizeC, 1 )
        residual_coding( x0, y0 + ( tIdx << log2TrafoSizeC ), log2TrafoSizeC, 2 )
    } else if( blkIdx = = 3 ) {
        ...
        residual_coding( xBase, yBase + ( tIdx << log2TrafoSize ), log2TrafoSize, 1 )
        residual_coding( xBase, yBase + ( tIdx << log2TrafoSize ), log2TrafoSize, 2 )
    }
  }
}
``` | |

Figure 5:
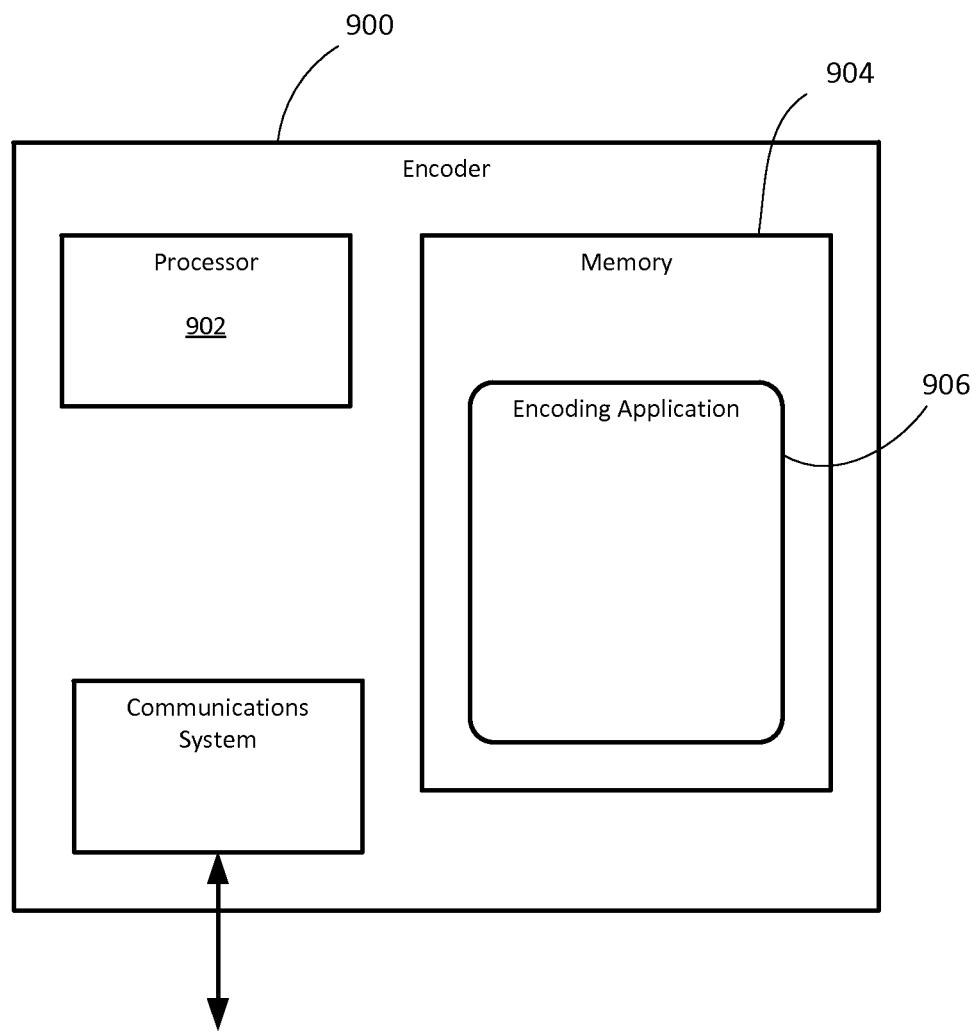
FIG. 5 shows a simplified block diagram of an example embodiment of an encoder.

When finding chroma QP values for the scaling of chroma transform coefficients, the following example rules may be applied:

1. If lowfidelity_cu_flag[xCb][yCb] is 1, then loFiCbQpOffset is set equal to lowfidelity_qp_cb_offset, and loFiCrQpOffset is set equal to lowfidelity_qp_cr_offset.
2. Otherwise, loFiCbQpOffset and loFiCrQpOffset are both set to zero.
3. The variables $qP_{Cb}$ and $qP_{Cr}$ are set equal to the value of $Qp_C$ based on the index qPi equal to $qPi_{Cb}$ and $gPi_{Cr}$, respectively, and $qPi_{Cb}$ and $qPi_{Cr}$ are derived as follows:
   a. $qPi_{Cb}$=Clip3(-QpBdOffset$_C$, 57, Qp$_Y$+pp-s_cb_qp_offset+slice_cb_qp_ offset+loFiCbQpOffset)
   b. $qPi_{Cr}$=Clip3(-QpBdOffset$_C$, 57, Qp$_Y$+pp-s_cr_qp_offset+slice_cr_qp_offset+loFiCrQpOffset)
4. The chroma quantization parameters for the Cb and Cr components, $Qp'_{Cb}$, and $Qp'_{Cr}$, are derived as follows:
   a. $Qp'_{Cb}$=$qP_{Cb}$+QpBdOffset$_C$
   b. $Qp'_{Cr}$=$qP_{Cr}$+QpBdOffset$_C$ Reference is now made to FIG. 5, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 6:
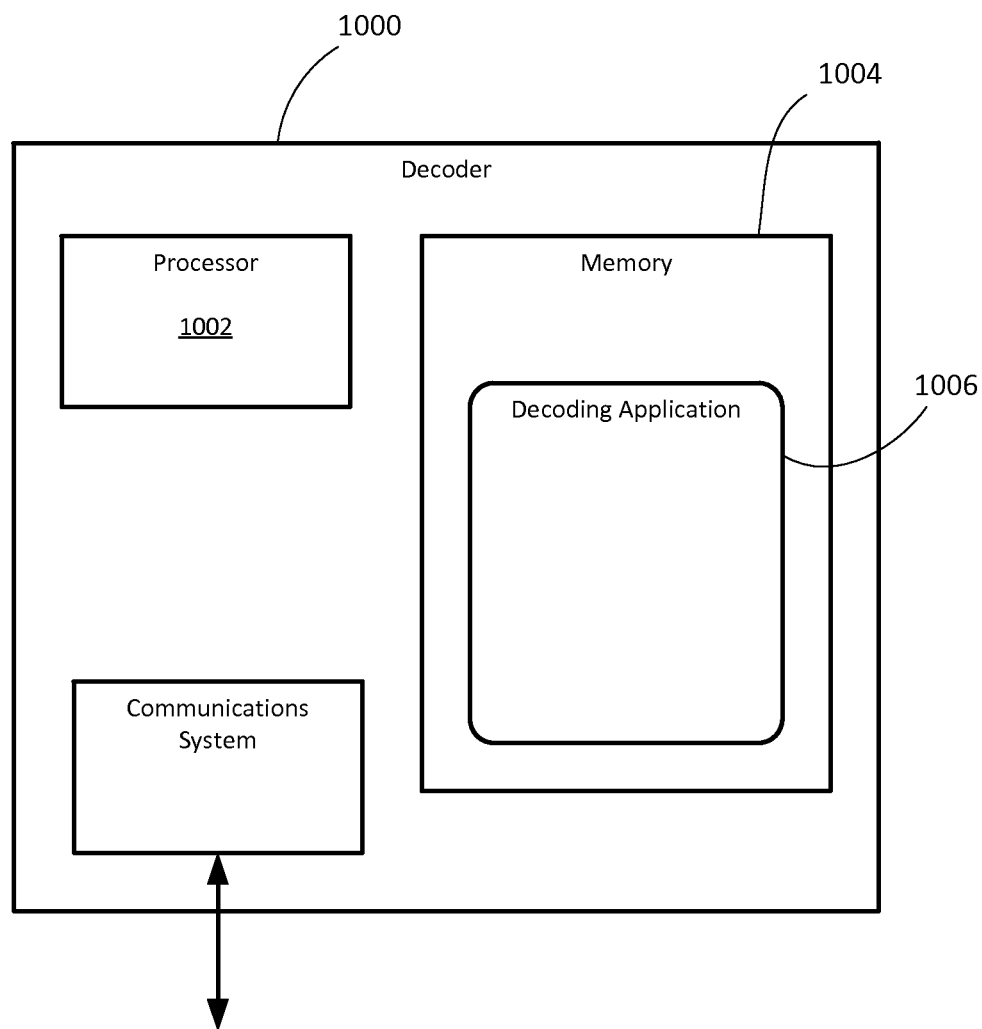
FIG. 6 shows a simplified block diagram of an example embodiment of a decoder.

Reference is now also made to FIG. 6, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present disclosure may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present disclosure is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding video from a bitstream of encoded video using a video decoder, the video including a picture partitioned into coding units, the method comprising:
    for one of the coding units,
        decoding, from the bitstream, a chroma-low-fidelity flag associated with that coding unit and associated with a chroma video component;
        if the chroma-low-fidelity flag is set, then determining a chroma quantization parameter for the chroma video component based upon a luma quantization parameter and a low-fidelity-mode offset;
        if the chroma-low-fidelity flag is not set, then determining the chroma quantization parameter for the chroma video component based upon the luma quantization parameter without using the low-fidelity-mode offset; and
        dequantizing decoded coefficients of the chroma video component for that coding unit, based upon the chroma quantization parameter, to produce dequantized coefficients.

2. The method claimed in claim 1, wherein decoding the chroma-low-fidelity flag comprises decoding the chroma-low-fidelity flag from a coding unit header associated with said one of the coding units.

3. The method claimed in claim 1, the method further comprising:
    if the chroma-low-fidelity flag is set, determining the minimum transform size used to decode a transform block associated with the chroma video component of that coding unit, based upon a low-fidelity-specific minimum;
    if the chroma-low-fidelity flag is not set, using a predetermined minimum transform size for use in decoding a transform block associated with that coding unit; and
    decoding, from the bitstream, a transform tree in the chroma video component for the coding unit based upon the minimum transform size, to produce decoded coefficients.

4. The method claimed in claim 1, the method further comprising:
    if the chroma-low-fidelity flag is set, determining the number of intra prediction modes associated with the chroma video component of that coding unit to be one;
    if the chroma-low-fidelity flag is not set, determining the number of intra prediction modes associated with the chroma video component of that coding unit, based upon the partitioning of the coding unit; and
    decoding, from the bitstream, the determined number of intra prediction modes for the chroma video component of that coding unit.

5. The method claimed in claim 1, wherein the low-fidelity-mode offset is decoded from a picture parameter set or a sequence parameter set.

6. The method of claim 1, wherein regardless of whether the chroma-low-fidelity flag is set or not set, determining the chroma quantization parameter is further based on a predetermined chroma QP offset value.

7. The method claimed in claim 6, wherein if the chroma-low-fidelity flag is set, determining is based upon the sum of the luma quantization parameter, the predetermined chroma QP offset value, and the low-fidelity-mode offset.

8. The method of claim 6, wherein if the chroma-low-fidelity flag is set, then the determining is based upon indexing a first look-up table with the sum of the luma quantization parameter, the predetermined chroma QP offset value, and the low-fidelity-mode offset, and if the chroma-low-fidelity flag is not set, then the determining is based upon indexing a second look-up table with the sum of the luma quantization parameter and the predetermined QP offset value.

9. The method claimed in claim 8, wherein the bitstream is encoded in a high-fidelity format, and wherein indexing the first look-up table to determine the chroma quantization parameter comprises indexing a chroma-subsampled format look-up table of chroma quantization parameters, and indexing the second look-up table comprises indexing a high-fidelity format look-up table different from the chroma-subsampled format look-up table.

10. The method claimed in claim 9, wherein the high-fidelity format is one of 4:4:4 and 4:2:2, and wherein the chroma-subsampled format is 4:2:0.

11. The method of claim 8, wherein the first look-up table is the same as the second look-up table.

12. A decoder for decoding a bitstream of encoded video to dequantize coefficients in a video decoder, the video including a picture partitioned into coding units, the decoder comprising:
    a processor;
    a non-transitory memory; and
    a decoding application stored in the memory and containing instructions that, when executed by the processor, cause the processor to:
        for one of the coding units,
            decode, from the bitstream, a chroma-low-fidelity flag associated with that coding unit and associated with a chroma video component;
            if the chroma-low-fidelity flag is set, then determine a quantization parameter for the chroma video component based upon a luma quantization parameter and a low-fidelity-mode offset;
            if the chroma-low-fidelity flag is not set, then determine the chroma quantization parameter for the chroma video component based upon the luma quantization parameter without using the low-fidelity-mode offset; and
            dequantize decoded coefficients of the chroma video component for that coding unit, based upon the chroma quantization parameter, to produce dequantized coefficients.

13. The decoder claimed in claim 12, the instructions further comprising instructions that, when executed, cause the processor to:
    if the chroma-low-fidelity flag is set, determine the minimum transform size used to decode a transform block associated with the chroma video component of that coding unit, based upon a low-fidelity-specific minimum;

if the chroma-low-fidelity flag is not set, use a predetermined minimum transform size for use in decoding a transform block associated with that coding unit; and decode, from the bitstream, a transform tree in the chroma video component for the coding unit based upon the minimum transform size, to produce decoded coefficients.

14. The decoder claimed in claim 12, the instructions further comprising instructions that, when executed, cause the processor to:
if the chroma-low-fidelity flag is set, determine the number of intra prediction modes associated with the chroma video component of that coding unit to be one;
if the chroma-low-fidelity flag is not set, determine the number of intra prediction modes associated with the chroma video component of that coding unit, based upon the partitioning of the coding unit; and
decode, from the bitstream, the determined number of intra prediction modes for the chroma video component of that coding unit.

15. The decoder of claim 12, wherein the instructions cause the processor to decode the low-fidelity mode offset from a picture parameter set or a sequence parameter set.

16. The decoder of claim 12, wherein the instructions cause the processor to, regardless of whether the chroma-low-fidelity flag is set or not, determine the chroma quantization parameter further based on a predetermined QP offset value.

17. The decoder claimed in claim 16, wherein if the chroma-low-fidelity flag is set, the instructions cause the processor to determine the chroma quantization parameter based upon the sum of the luma quantization parameter, the predetermined chroma QP offset value, and the low-fidelity-mode offset.

18. The decoder of claim 16, wherein if the chroma-low-fidelity flag is set, then the determining is based upon indexing a first lookup table with the sum of the luma quantization parameter, the predetermined chroma QP value offset value, and the low-fidelity-mode offset and if the chroma-low-fidelity flag is not set, then the determining is based upon indexing a second lookup table with the sum of the luma quantization parameter and the predetermined QP offset value.

19. The decoder claimed in claim 18, wherein the bitstream is encoded in a high-fidelity format, and wherein indexing the first look-up table to determine the chroma quantization parameter comprises indexing a chroma-subsampled format look-up table of chroma quantization parameters, and indexing the second look-up table comprises indexing a high-fidelity format look-up table different from the chroma-subsampled format look-up table.

20. The decoder claimed in claim 19, wherein the high-fidelity format is one of 4:4:4 and 4:2:2, and wherein the chroma-subsampled format is 4:2:0.

21. The decoder of claim 18, wherein the first look-up table is the same as the second look-up table.

22. The decoder of claim 12, wherein when the chroma-low-fidelity flag is set the instructions cause the processor to determine the chroma quantization parameter by using a clipping operation.

23. The decoder of claim 12, wherein when the chroma-low-fidelity flag is set the instructions cause the processor to determine the chroma quantization parameter further based on a bit depth of the picture.

24. A non-transitory processor-readable medium storing processor-executable instructions to decode video from a bitstream of encoded video, the video including a picture partitioned into coding units, wherein the instructions, when executed, cause one or more processors to:
for one of the coding units,
decode, from the bitstream, a chroma-low-fidelity flag associated with that coding unit and associated with a chroma video component;
if the chroma-low-fidelity flag is set, then determine a chroma quantization parameter for the chroma video component based upon a luma quantization parameter and a low-fidelity-mode offset;
if the chroma-low-fidelity flag is not set, then determine the chroma quantization parameter for the chroma video component based upon the luma quantization parameter without using the low-fidelity-mode offset; and
dequantize decoded coefficients of the video component for that coding unit, based upon the chroma quantization parameter, to produce dequantized coefficients.

* * * * *